US008117657B1

(12) United States Patent
Elrod et al.

(10) Patent No.: US 8,117,657 B1
(45) Date of Patent: Feb. 14, 2012

(54) DETECTION AND MITIGATION OF RAPIDLY PROPAGATING THREATS FROM P2P, IRC AND GAMING

(75) Inventors: Craig T. Elrod, Santa Clara, CA (US); Timothy J. Bardzil, San Jose, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 1149 days.

(21) Appl. No.: 11/765,688

(22) Filed: Jun. 20, 2007

(51) Int. Cl.
*G06F 21/20* (2006.01)

(52) U.S. Cl. .................. 726/23; 726/24; 726/25; 726/3; 713/151; 713/153

(58) Field of Classification Search ........... 713/151–153
See application file for complete search history.

(56) References Cited

U.S. PATENT DOCUMENTS

| | | | | |
|---|---|---|---|---|
| 7,401,353 B2 * | 7/2008 | Airamo | ............................. | 726/1 |
| 7,587,617 B2 * | 9/2009 | Margolus et al. | ............ | 713/193 |
| 7,706,273 B2 * | 4/2010 | Poletto et al. | ................. | 370/235 |
| 7,730,521 B1 * | 6/2010 | Thesayi et al. | ..................... | 726/4 |
| 7,761,918 B2 * | 7/2010 | Gula et al. | ........................ | 726/23 |
| 7,948,889 B2 * | 5/2011 | Lalonde et al. | ............... | 370/235 |
| 2003/0084349 A1 * | 5/2003 | Friedrichs et al. | ............ | 713/201 |
| 2005/0030959 A1 * | 2/2005 | Kunze et al. | .................. | 370/401 |
| 2005/0256735 A1 * | 11/2005 | Bayne | ............................... | 705/1 |
| 2006/0056393 A1 * | 3/2006 | Sarmiento | ..................... | 370/352 |
| 2006/0095968 A1 * | 5/2006 | Portolani et al. | ................. | 726/23 |
| 2006/0179296 A1 * | 8/2006 | Bartlett et al. | ................. | 713/152 |
| 2006/0185014 A1 * | 8/2006 | Spatscheck et al. | ............ | 726/23 |
| 2006/0209797 A1 * | 9/2006 | Anisimov et al. | ............. | 370/352 |
| 2006/0242694 A1 * | 10/2006 | Gold et al. | ........................ | 726/13 |
| 2007/0056038 A1 * | 3/2007 | Lok | .................................. | 726/23 |
| 2007/0157306 A1 * | 7/2007 | Elrod et al. | ...................... | 726/14 |
| 2007/0165572 A1 * | 7/2007 | Lenzarini | ........................ | 370/331 |
| 2007/0192863 A1 * | 8/2007 | Kapoor et al. | ................... | 726/23 |
| 2007/0261112 A1 * | 11/2007 | Todd et al. | ........................ | 726/11 |
| 2007/0261119 A1 * | 11/2007 | Jung et al. | ........................ | 726/24 |
| 2008/0219271 A1 * | 9/2008 | Ollikainen | .................... | 370/400 |
| 2008/0253380 A1 * | 10/2008 | Cazares et al. | ........... | 370/395.53 |

OTHER PUBLICATIONS

Karygiannis A, Detecting Critical Nodes for MANET intrusion detection systems, Jun. 29, 2006, NIST, SecPeru 2006, pp. 1-9.*
Geethapriya Thamilarasu, A cross-layer based Intrusion Detection Approach for Wireless Ad hoc Networks, Nov. 7, 2005, IEEE, vol. 7, pp. 1-7.*

* cited by examiner

*Primary Examiner* — Nathan Flynn
*Assistant Examiner* — Viral Lakhia
(74) *Attorney, Agent, or Firm* — Blakely, Sokoloff, Taylor & Zafman (57) ABSTRACT

A network switch detects at least two simultaneous connections on a single network port. The simultaneous connections use different protocols despite using the same port. The network switch mirrors network traffic associated with the simultaneous connections to a security management device on the network. The security management device then determines a source or destination of the network traffic.

17 Claims, 4 Drawing Sheets

DETECTION AND MITIGATION OF RAPIDLY PROPAGATING THREATS FROM P2P, IRC AND GAMING

FIELD

Embodiments of the invention relate to network security, and more particularly to peer-to-peer or point-to-point (P2P), internet relay chat (IRC), and gaming security.

BACKGROUND

Hacking is a term that is often used to describe the acts of a user who trespasses on computer systems for any number of reasons. Oftentimes, intruders hack into a system or network of systems ("system") with the intent to launch some form of attack against the system. An attacker, as used herein, refers to any user, host system, or remote host machine that hacks, trespasses, or intrudes onto a system and attempts to compromise the integrity or performance of the system.

Attackers can be very sophisticated and difficult to detect. Most attackers operate from or through a remote system or even a chain of several remote systems to obscure their identity and/or location. Attackers are often very thorough and methodical in using reconnaissance to create a detailed map of a network and identify any network vulnerabilities.

Reconnaissance typically involves a process of gathering information, scanning a target network, and probing for weaknesses in the target network before launching an attack. In the information-gathering phase, an attacker collects information about a network (e.g. a company network) in an attempt to obtain as many domain names as possible. The domain names are then used to query domain name servers (DNS servers) for network (e.g., Internet Protocol (IP)) addresses of hosts in the network. This process is sometimes called footprinting. Additionally, attackers may also perform a broad sweep of a network to probe for IP addresses assigned to additional hosts.

In the scanning phase, an attacker can learn which services are running on each host and which ports the services are using. An application service can be accessed from a network through a Transmission Control Protocol (TCP) or User Datagram Protocol (UDP) port number assigned to the application service.

In the final phase of reconnaissance, attackers search the target network specifically for resources such as device and file resources in order to acquire information about network security and network vulnerabilities.

Once the reconnaissance process has provided sufficient information, an attacker may launch an attack. There are many types of network attacks that can cause serious performance problems on a network. Attacks including, but not limited to, Denial of Service (DoS), Distribute DoS (DDoS), viruses, worms, polymorphic viruses, blended attacks, and Day-Zero threats can be launched against a network to disrupt configuration and routing information and physical network components. Attacks can also tie up and/or consume network bandwidth, host central processing unit (CPU) time, and disk space. One example of a DoS attack is a TCP flood attack. Another example of a DoS attack is a Smurf attack.

Most networks employ some form of network security to help against many of the attacks discussed above. However, many network security systems and/or devices rely on signature-based security techniques. In other words, these security systems maintain a list of known security threats, or signatures, and can only prevent or mitigate damage based on these known security threats. One problem with signature-based security is that it is not effective in preventing or mitigating unknown security threats and Day-Zero attacks. Additionally, many of today's network security systems need to be "in-line" with the network to mitigate threats and can, therefore, end up being bottlenecks or points of failure in the network.

Peer-to-Peer or Point-to-Point (P2P) file sharing applications create unique security concerns. P2P clients initiate connections from an internal network to the outside (e.g., outside of an organization). Firewalls and other perimeter security devices allow outbound connections, and open the ports necessary for these connections to happen. This opens a significant security hole for viruses, worms and other malicious code to penetrate the internal network and wreak havoc, for example, by taking down the internal network. Of additional concern, P2P applications may involve file sharing that violates copyright laws. Beyond security concerns, P2P applications can monopolize valuable network bandwidth.

BRIEF DESCRIPTION OF THE DRAWINGS

The following description includes discussion of various figures having illustrations given by way of example of implementations of embodiments of the invention. The drawings should be understood by way of example, and not by way of limitation.

SUMMARY OF THE INVENTION

Peer-to-Peer (P2P), Internet Relay Chat (IRC), and gaming applications on random ports use Transmission Control Protocol (TCP) and User Datagram Protocol (UDP) connections on the same ports at the same time. Thus, a network switch detects at least two simultaneous connections established using different protocols on a single network port. The network switch mirrors network traffic associated with the simultaneous connections to a security management device on the network. The security management device evaluates the traffic based on one or more rules or policies. The security management device can determine a source or destination of the network traffic and takes action to block, reduce or redirect the traffic.

DETAILED DESCRIPTION

In one embodiment of the invention, threats are detected at a network switch, or simply, switch. As used herein, a threat may refer to network traffic that is a precursor to harmful network activity or that otherwise threatens the integrity/performance of the network or a system/device on the network. For example, traffic originating from applications (legitimate or illegitimate) that monopolize network bandwidth can be a threat. The terms "threat" or "network threat" may also be used interchangeably with "attack," "network attack," "attacker," "harmful traffic," "suspicious traffic," "source," or "source of harmful traffic" as used herein.

Peer-to-Peer or Point-to-Point (P2P), Internet Relay Chat (IRC), and gaming applications initiate connections from an internal network to the outside (e.g., outside of an organization). Firewalls and other perimeter security devices allow outbound connections, and open the ports necessary for these connections to happen. This opens a significant security hole for viruses, worms and other malicious code to penetrate the internal network and wreak havoc, for example, by taking down the internal network. Of additional concern, P2P applications may involve file sharing that violates copyright laws. Beyond security concerns, P2P applications can monopolize valuable network bandwidth. For at least these reasons, P2P, IRC, and gaming applications may be considered threats to a network.

Examples of P2P applications include, but are not limited to, Kazaa, Fasttrack, Gnutella (Limewire, Morpheus, Bear-Share), eDonkey, eMule, BitTorrent, Direct Connect, and WinMx. IRC applications, as used herein, refer to applications that facilitate real-time (or nearly real-time) communication between two or more users on a network. Gaming applications, as used herein, refer to any games that use computer networking Frequently, gaming applications involve multiple players. Thus, a computer network allows players to play together despite being in disparate locations.

Threats are detected by a switch using dynamic policy rules designed to detect artifacts and identify footprints of the threats. In one embodiment, the switch utilizes Continuous, Learning, Examination, Action and Reporting of Flows (CLEAR-Flow) technology, available from Extreme Networks, Inc. of Santa Clara, Calif., assignee of the present invention. Dynamic policy rules are implemented, for example, using access control lists (ACLs), which define profiles of potentially problematic network traffic flows and corresponding actions to be taken by the switch if traffic flows meeting any one of these profiles are measured. In one embodiment, a switch measures the ratio of incoming Address Resolution Protocol (ARP) requests to outgoing ARP responses in the network traffic. If the ratio is above a predetermined threshold, the switch, using dynamic policy rules, may determine that a threat exists. In another embodiment, the switch measures the ratio of incoming TCP SYN packets to incoming TCP ACK packets. Again, if the ratio is above a predetermined threshold, the switch may determine that a threat exists.

In addition to measuring ratios of packets, ACLs may be used in a switch to measure other usage-based packet statistics including, but not limited to, cumulative counts of packets meeting a certain profile, cumulative counts of packet bytes from packets meeting a certain profile, rates, or changes in rates, at which packets are received, etc. For example, P2P, IRC and gaming application use TCP and UDP connections on the same ports at the same time. Thus, ACLs may be used in a switch to detect P2P, IRC and/or gaming traffic based on port connections.

In one embodiment, network threats, P2P, IRC, and/or gaming traffic streams are copied and sent from the switch to a security management device for further analyzing. In addition to copying network threats, P2P, IRC, and/or gaming traffic, the switch sends other useful information to the security management device, for example, using an eXtensible Markup Language (XML) application program interface (API). The useful information can include details from the switch's forwarding database (FDB) such as media access control (MAC) addresses, IP addresses, and corresponding switch port numbers of ports with which devices assigned to those addresses are reachable.

The security management device is able to build communication streams with the information received from the switch to determine the exact source of a threat and/or target of attack. Building communication streams can involve identifying, analyzing, tracking, and/or extracting certain packet fields or other information from network traffic, including packets. In one embodiment, the security management device may track the source IP address field and the destination IP address field of packets to determine the source and the target of the attack. In another embodiment, the security management device uses the information from the switch's FDB to determine the source and the target of the attack. A combination of FDB information and packet field information may also be used. Thus, the security management device is able to combine collected information to construct or build a model that defines the communication stream between the source and the target of an attack.

Once the source of an attack has been determined, the security management device redirects the source data stream(s). In one embodiment, redirecting involves re-writing the ARP table on the attacker's system by sending unsolicited ARP requests that substitute the MAC address of the security management device in place of the MAC address of the intended target system. In other embodiments, redirecting can be done using ACLs, policy routing, virtual local area network (VLAN) identification (ID), Hypertext Transfer Protocol (HTTP) information, or XML tags. In embodiments, redirecting causes traffic and/or data streams from the attacker to be redirected and sent to the security management device instead of the intended target system. The security management device subsequently drops, ignores, or selectively passes the redirected traffic and/or data stream(s).

In addition to redirecting the attacker's system, the security management device dynamically builds a policy to be employed at the switch. A policy defines an action or set of actions to be carried out when a predetermined event or set of events occurs. In one embodiment, the policy causes the switch to block traffic from the source of an attack based on the IP address(es) of the attacker. In other embodiments, the policy causes the switch to block traffic based on MAC address(es), VLAN IDs, or switch port number(s) used by an attacker. Further embodiments include a policy that causes the switch to quarantine traffic from the attacker to an isolated VLAN, throttle traffic from the attacker by limiting the network bandwidth to the attacker, or warn other switches of the threat/attack.

Once a policy has been created, the security management device sends the policy to at least the switch that detected the threat, for example, using the XML API mentioned above. The switch then enforces the policy to mitigate the threat/attack.

Figure 1A:
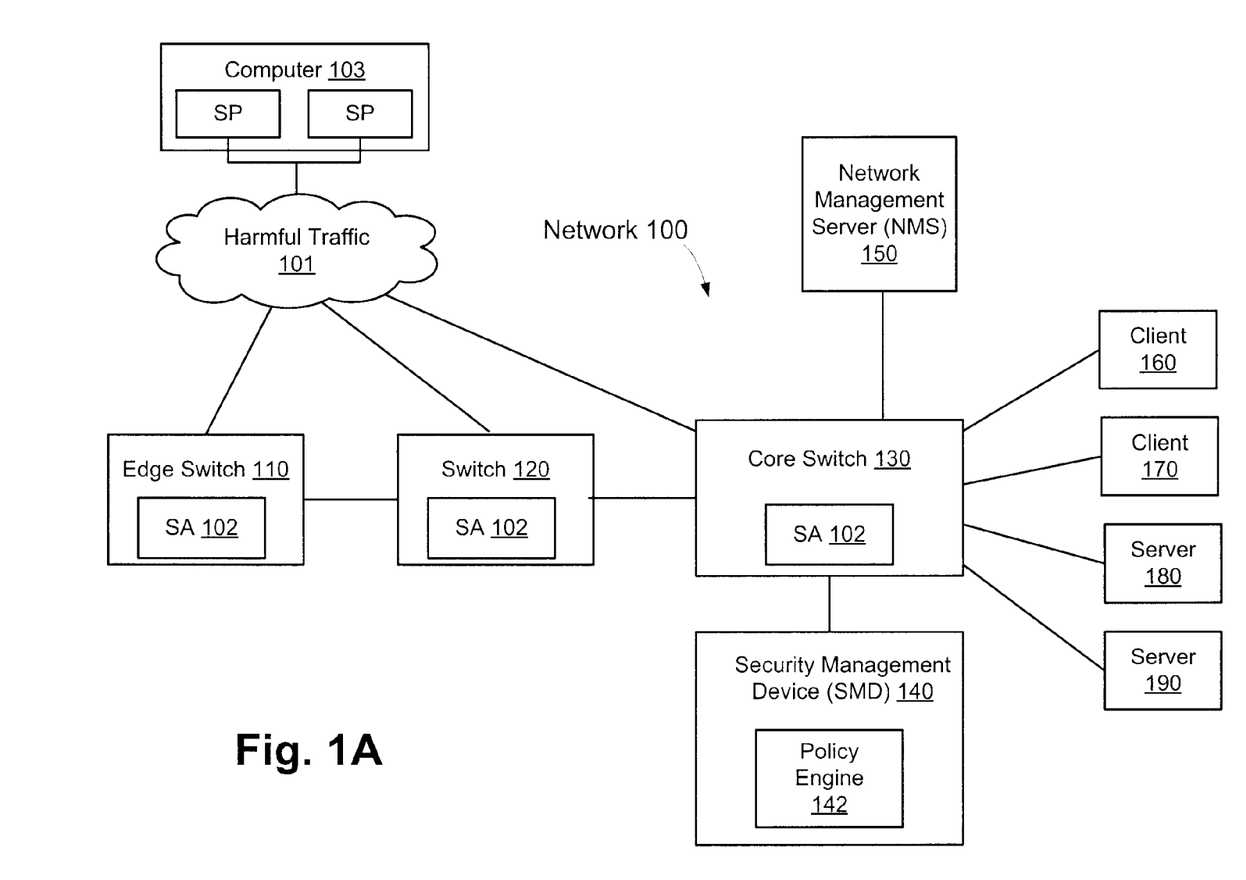
FIG. 1A is a block diagram illustrating an embodiment having a security management device.

FIG. 1A illustrates an embodiment of the invention. Harmful traffic 101 enters a network 100 through a switch 110, 120, or 130. Each switch monitors and examines every packet that arrives in real-time at a one gigabit per second (Gb/s) forwarding rate or a ten Gb/s forwarding rate. In other embodiments, the switch monitors/examines packets arriving at other forwarding rates.

In one embodiment, each switch contains a security agent 102 to monitor/examine traffic flowing through the switch. Security agents 102 each contain a policy file with access control list (ACL) rules that allow security agents 102 to increment counters and collect statistics on traffic flowing through switches. Additional rules are included in the policy files to monitor the counters and statistics. The ACL rules also define profiles of potentially problematic network traffic flows and corresponding actions to be taken by a switch if traffic flows meeting one of these profiles are measured. The policy files may be updated dynamically, as discussed in more detail later. Security agents 102 may also monitor a cumulative counter, a change or delta in a counter over a time interval, the ratio of two cumulative counters, and the ratio of a change or delta in two counters over a time interval.

Each switch is capable of detecting harmful traffic 101 using the dynamic policy rules discussed above. In one embodiment, harmful traffic is detected when a ratio of measured ARP requests to ARP replies exceeds a specified threshold. In another embodiment, harmful traffic is detected when a ratio of measured TCP SYN packets to TCP ACK packets exceeds a specified threshold.

In yet another embodiment, harmful traffic is detected based on simultaneous connections on a single service port where the connections use different protocols (e.g., TCP and UDP). P2P, IRC and gaming applications can be distinguished from regular IP traffic in that these applications use well known harmful application service port numbers on TCP and UDP connections, at the same time. For example, switch 120 might detect both a TCP connection and a UDP connection existing at the same time on service port (SP) 3531 (a known port for Kazaa traffic) of computer 103. Thus, security agent 102 of switch 120 may determine that traffic to or from SP 3531 to/from computer 103 is potentially harmful traffic. The table below illustrates the port numbers for a variety of P2P, IRC and gaming applications:

| P2P Application | Connection/Service Ports |
| --- | --- |
| Kazaa | TCP/UDP 3531 |
| Fasttrack | TCP/UDP 1214 |
| Gnutella (Limewire, Morpheus, BearShare) | TCP/UDP 6346-6348 |
| eDonkey, eMule | TCP/UDP 4661-4672 |
| BitTorrent | TCP/UDP 6881-6889 |
| Direct Connect | TCP/UDP 411-412 |
| WinMx | TCP/UDP 6699 |
| IRC Applications | Connection Ports |
| IRC | TCP/UDP 6667, 7000, 7514 |
| Gaming Applications | Connection Ports |
| Gaming | TCP/UDP 6112, 6868, 6899, 27015-27050 |

The table above is not intended to be an exhaustive list of all P2P, IRC and gaming applications and their respective connection/service ports. Other applications and/or other known connection/service ports may be used in embodiments of the invention.

In another embodiment, P2P traffic can be detected with a security agent 102 on a switch based on packet counts, packet rates, and/or changes in rate. P2P traffic often involves the transfer of large quantities of data. Thus, P2P traffic can be detected by detecting long running services.

In yet another embodiment, harmful traffic is detected based on known port numbers. For example, P2P traffic may be considered harmful traffic and port 3531 is a known port for Kazaa traffic while port 1214 is a known port for Fasttrack traffic. Thus, harmful traffic having a known port as either the source or destination port can be detected.

Harmful (or potentially harmful) traffic is mirrored to a security management device (SMD) 140 reachable via, for example, a dedicated port, upon detection by a switch. Traffic that does not violate policy rules, however, is handled by the switch per standard bridging and routing technologies. Only harmful or potentially harmful traffic is mirrored to SMD 140. In one embodiment, traffic mirrored to SMD is labeled with the threat-type "suspicious." Mirroring suspicious traffic to SMD 140 allows SMD 140 to operate "virtually" in-line rather than physically in-line with the network. In other words, it is not necessary for traffic to pass through SMD 140 to reach a destination because only copies of suspicious traffic are passed to SMD 140. Thus, SMD 140 operates without the latency or point-of-failure risks inherent in physical in-line operation. In one embodiment, SMD 140 is a single device deployed at the network core, illustrated in FIG. 1A. In other embodiments, SMD 140 can be deployed at different locations within the network, including at a network edge.

Figure 1B:
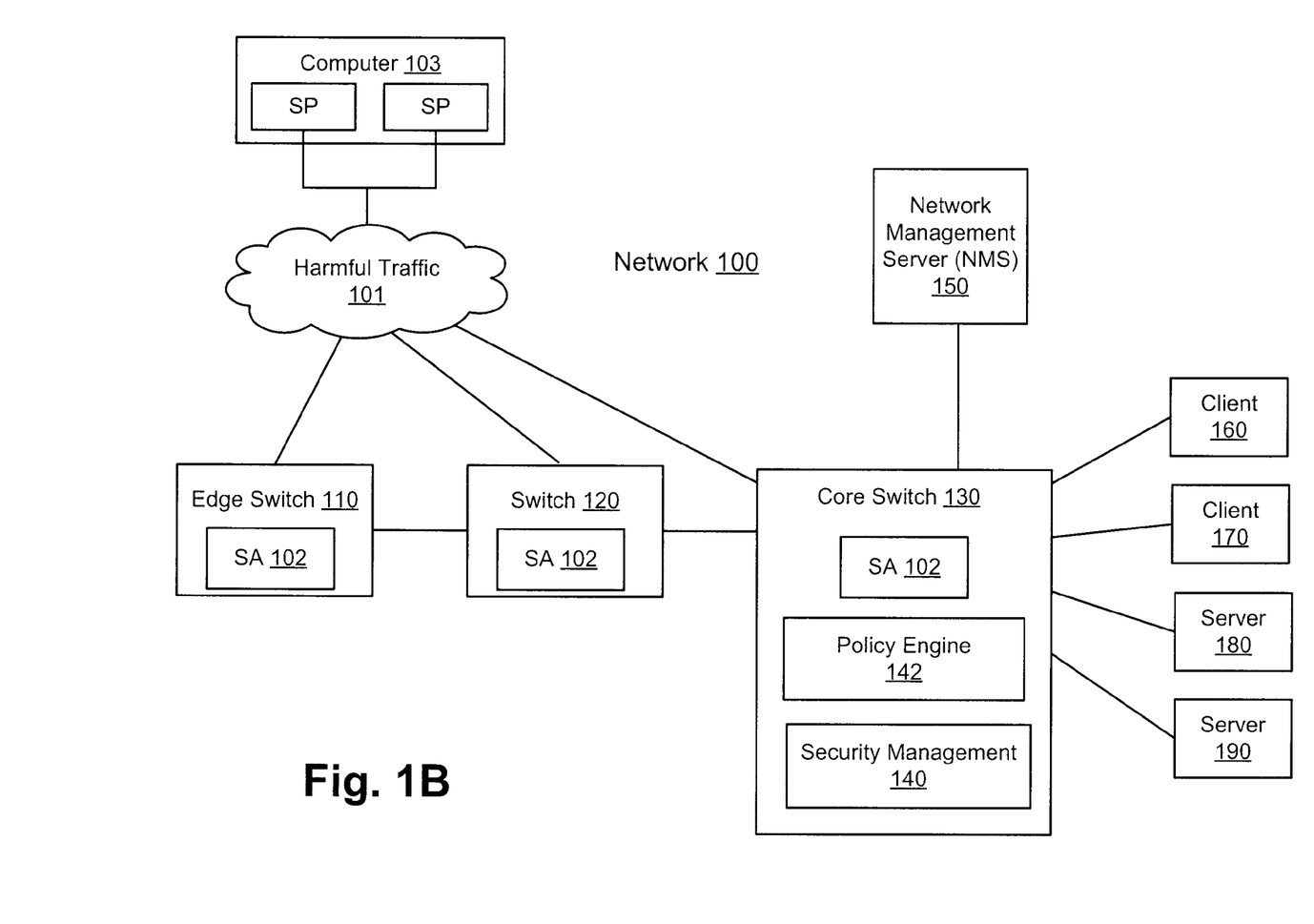
FIG. 1B is a block diagram illustrating an embodiment having security management within a network switch

In another embodiment, SMD functionality is implemented using a combination of SMD 140 and a network management server 150. FIG. 1B is an illustration of yet another embodiment where SMD functionality, including threat detection logic, is implemented as an application-specific integrated circuit (ASIC) or a system-on-a-chip (SoC) within core switch 130 or any other network switch.

SMD 140 uses behavior-based threat detection methods to further classify, analyze and/or mitigate suspicious traffic mirrored from a switch. In one embodiment, SMD 140 identifies a communication stream by extracting information from suspicious traffic. Building a communication stream involves assembling information that allows SMD 140 to characterize the exact source and destination of the suspicious traffic. In one embodiment, the information extracted by SMD 140 includes source and destination IP addresses from the address fields of packets. In another embodiment, each switch provides information from its forwarding database (FDB) to SMD 140 using an XML application program interface (API). The provided information correlates MAC addresses with IP addresses and port numbers. SMD 140 uses this information to determine the exact source and destination of the suspicious traffic.

Having determined the source (e.g. MAC address) and destination of suspicious traffic, SMD 140 continues to monitor the suspicious traffic. In one embodiment, SMD 140 uses internal policy rules to further analyze suspicious traffic and, when conditions are met, escalate the threat-type, for example, from "suspicious" to "yellow alert." SMD 140 sends a dynamic ACL to security agent(s) 102 to further refine the policy for suspicious traffic flows. The ACL is dynamic in the sense that it is automatically sent to security agent(s) 102 in response to measured traffic flows—no network administrator/operator action or intervention is needed. Security agent(s) 102 apply the dynamic ACL at the respective switch(es) in real-time while the switch(es) continue(s) to mirror suspicious traffic to SMD 140.

While monitoring suspicious traffic and updating policy files in security agents 102, SMD 140 may also determine that suspicious traffic is actually harmful traffic representing a real threat to the integrity/stability of the network or a client/server operating on the network. In one embodiment, SMD 140 escalates the threat type, for example, from "yellow alert" to "red alert" when a real threat is detected and takes action(s) to mitigate the threat.

In one embodiment, SMD 140 redirects the source data stream (i.e., the source of the suspicious traffic), for example, in response to the red alert threat level, from an intended destination to an alternate destination. In most cases, the attacker will be unaware of the redirection of traffic, though it is not necessary that the attacker be unaware of this redirection.

In one embodiment, SMD 140 redirects the source data stream by reformulating the ARP tables of the source computer system. ARP table reformulation involves sending unsolicited ARP requests to the source computer system. Once received, these ARP requests substitute the MAC address of SMD 140 in place of the MAC address of the intended destination/target system. Thus, the ARP reformulation causes traffic from the source computer system that is intended for a particular target system to be received instead by SMD 140. In other embodiments, redirecting can be done using ACLs, policy routing, virtual local area network (VLAN) identification (ID), Hypertext Transfer Protocol (HTTP) information, or XML tags. In each of the above examples, SMD 140 initiates the redirecting process that causes traffic intended for a particular target system to be redirected to SMD 140.

SMD 140 can handle redirected traffic (e.g., packet traffic) in different ways. SMD 140 may ignore redirected packet traffic or silently discard it. In either case, the effect is that SMD 140 becomes a dead end for this traffic, thus eliminating any potential harm to the network from the traffic. However, if traffic flow conditions change or SMD 140 otherwise determines that certain packets are harmless, those packets may be forwarded to their originally intended destination.

In addition to redirecting the source data stream, SMD 140 builds a policy to mitigate the threat and/or block the source of the attack. In one embodiment, a policy engine 142 automatically generates policy rules for the policy. In another embodiment, NMS 150 generates policy rules for the policy.

In one embodiment, the policy is designed to cause network switches to block traffic based on the IP address(es) of the attacker. In other words, all traffic having a particular source IP address or source/destination IP address combination is blocked when detected at one of the network switches. In other embodiments, the policy causes network switches to block traffic based on MAC address(es), VLAN ID(s), switch port number(s), or other identifying information.

It is not necessary that the policy cause a switch to block traffic. Alternative embodiments may include a policy that causes a switch to quarantine harmful traffic to an isolated VLAN, throttle traffic from the attacker by limiting the network bandwidth available to the attacker, or warn other switches of the threat/attack.

After the policy has been created, it is sent from SMD 140 to the switch(es). In one embodiment, SMD 140 sends the policy to all switches. In another embodiment, SMD 140 sends the policy only to one switch. For example, if only a single switch stands logically between an attacker and the rest of the network, SMD 140 need only send the policy to that single switch. Security agent 102 implements the policy in real-time once it is received at the switch to mitigate harmful traffic.

Figure 2:
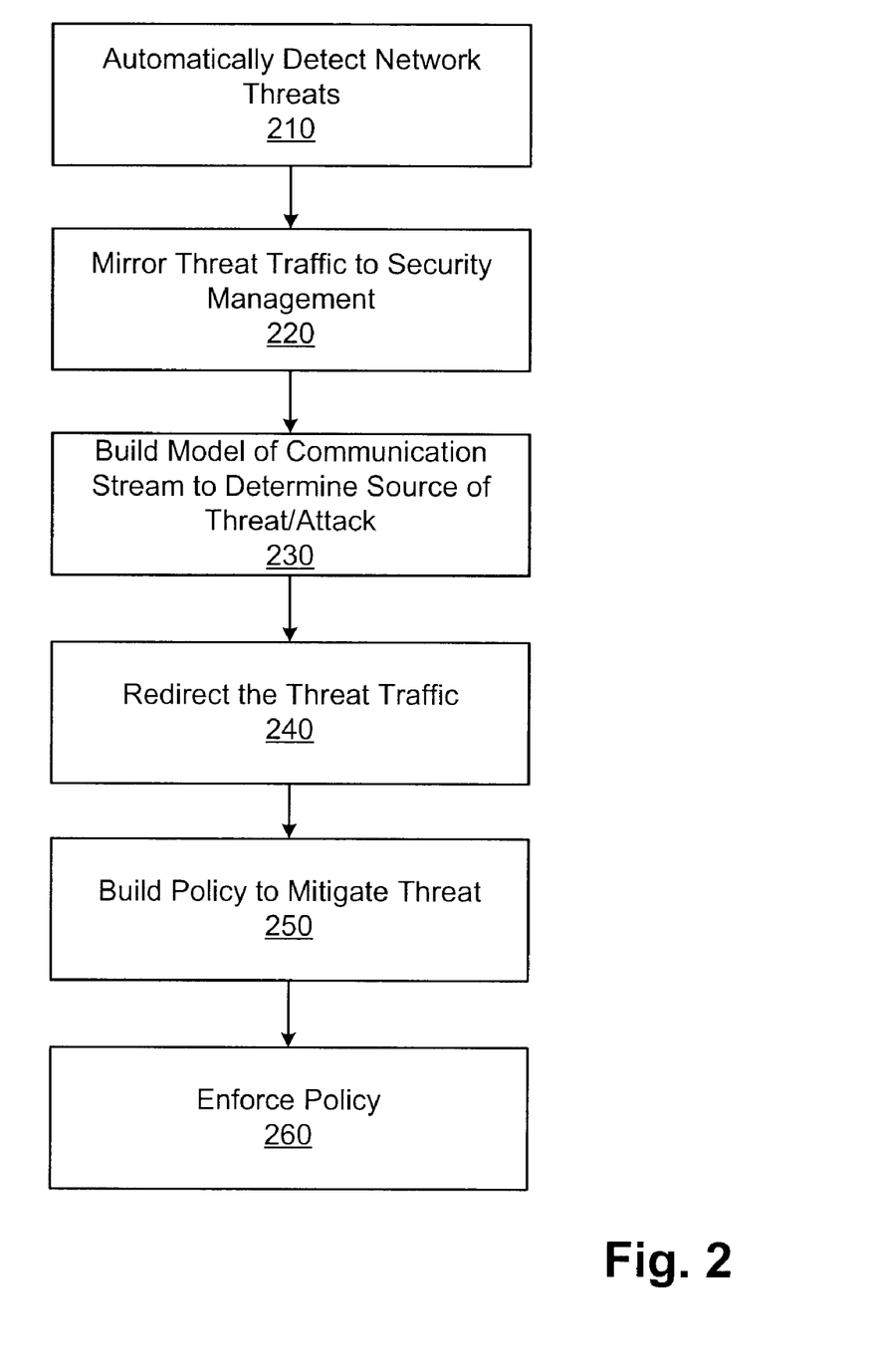
FIG. 2 is a flow diagram of an embodiment that employs security management for a network.

FIG. 2 is a flow diagram illustrating an embodiment of the invention. When a threat enters the network it is automatically detected 210. The network has the capability of measuring traffic flows. In one embodiment, a switch or other network device measures the ratio of incoming ARP requests to outgoing ARP responses in the network traffic. If the ratio is above a predetermined threshold, the switch or other network device, using dynamic policy rules, may determine that a threat exists. In another embodiment, the switch or other network device measures the ratio of incoming TCP SYN packets to outgoing TCP ACK packets. Again, if the ratio is above a predetermined threshold, the switch or other network device may determine that a threat exists. In yet another embodiment, harmful traffic is detected based on simultaneous connections on a single port where the connections use different protocols (e.g., TCP and UDP). In yet another embodiment, harmful traffic is detected based on known port numbers. For example, ports 6881-6889 are known ports for BitTorrent traffic; port 6112 is a known port for gaming traffic. Thus, harmful traffic having a known port as either the source or destination port can be detected.

In addition to measuring ratios of packets, ACLs may be used in a switch to measure other usage-based packet statistics including, but not limited to, cumulative counts of packets meeting a certain profile, cumulative counts of packet bytes from packets meeting a certain profile, rates at which packets are received, etc.

When a switch or other device determines that a traffic flow has exceeded a predetermined threshold, meets a certain profile, or is otherwise a threat, the switch/device mirrors that traffic flow to security management 220. In one embodiment, a device having a dedicated port to receive mirrored threat traffic handles security management. In another embodiment, a security management device shares security management tasks with a network management server. In yet another embodiment, security management functionality is implemented in a network switch (e.g., software, firmware logic, or an application-specific integrated circuit (ASIC)). Security management can extract information from the mirrored threat traffic flows, including packet fields from individual packets. Thus, security management can extract source and destination IP address fields from packets in the mirrored threat traffic.

In one embodiment, the switch or other network device that detects a threat sends other information to security management in addition to mirroring the threat traffic flow, including information from the switch's forwarding database that correlates MAC addresses with IP addresses and/or port numbers. With this information, security management re-creates, or builds, a model of the communication stream between the source of the threat traffic and the intended destination of the threat traffic to determine the exact source and intended destination of the threat/attack 230.

Once the source of the threat traffic is known, security management redirects the threat traffic 240. In one embodiment, security management redirects the threat traffic by reformulating the ARP tables of the source computer system (i.e. the computer system sending the threat traffic). In other embodiments, redirecting can be done using ACLs, policy routing, virtual local area network (VLAN) identification (ID), Hypertext Transfer Protocol (HTTP) information, or XML tags. In each of the above examples, security management initiates the redirecting process that causes traffic intended for a particular target system to be redirected to an alternate destination. In one embodiment, threat traffic is redirected to a security management device connected to a switch. In another embodiment, threat traffic is redirected to a particular switch having security management functionality. In yet another embodiment, redirecting causes threat traffic to be redirected to a network management server.

Security management also dynamically builds/creates a policy to mitigate the threat 250. In one embodiment, security management generates policy rules that cause a switch or other network device to block all incoming traffic from a particular source or block traffic having a particular destination. In other embodiments, the switch redirects traffic based on MAC addresses or IP addresses detected in incoming traffic. Other characteristics or profiles may also be used in determining which traffic to block. In addition to blocking traffic, policy rules can be created to cause a switch or other network device to throttle traffic from a particular source or throttle traffic traveling toward a particular destination. Other embodiments include rules for quarantining threat traffic to a designated VLAN and rules that cause other network switches or device to be warned of a threat/attack.

Once a policy has been created, it is sent to one or more network switches/devices, where it is enforced 260. Network switches/devices continue to monitor/examine traffic in real-time. As conditions or traffic flows change, security management may modify the policy for a particular switch/device or set of switches/devices.

Figure 3:
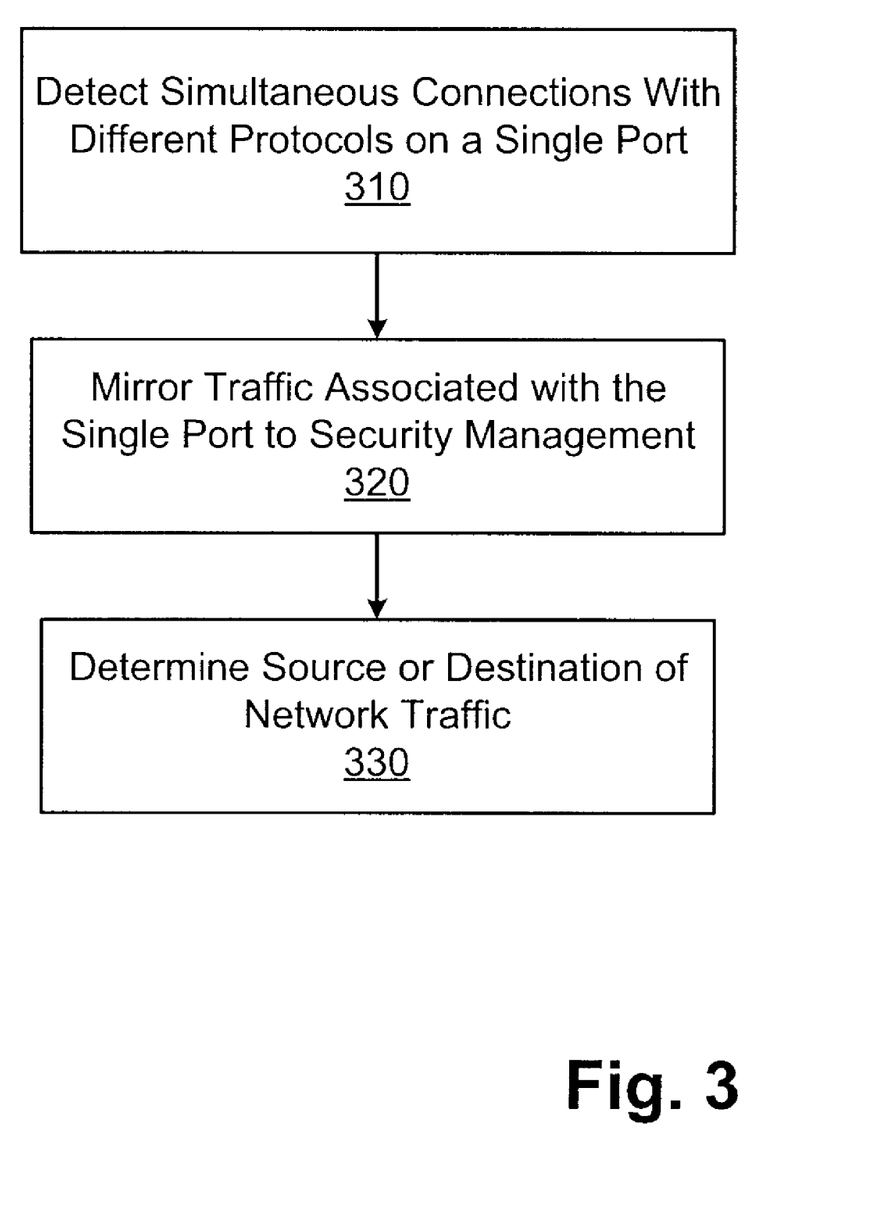
FIG. 3 is a block diagram illustrating an embodiment having a security management device.

FIG. 3 is a flow diagram illustrating an embodiment of the invention. Simultaneous connections on the same port using different protocols are detected by a network switch 310. Traffic associated with the port is mirrored to security management 320. Security management can be implemented as a stand-alone device or as an ASIC or SoC in a network switch. Security management can also be implemented in software or in firmware. Security management determines the source or destination of the traffic 330.

Each component described herein may be a means for performing the functions described. Each component described herein includes software, hardware, or a combination of these. The components can be implemented as software modules, hardware modules, special-purpose hardware (e.g., application specific hardware), embedded controllers, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (e.g., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.)

A machine readable medium may also include a storage or database from which content can be downloaded. A machine readable medium may also include a device or product having content stored thereon at a time of sale or delivery. Thus, delivering a device with stored content, or offering content for download over a communication medium may understood as providing an article of manufacture with such content described herein.

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method in a network switch operating within a network, the method comprising:

identifying, within traffic flowing through the network switch, potentially harmful traffic constituting a threat to operation of the network by detecting at least two simultaneous connections on a service port of the network switch, wherein a first protocol is used for a first connection on the service port and a second protocol is used for a second connection on the service port, herein the first protocol is different than the second protocol;

mirroring the potentially harmful traffic associated with the service port to a separately located security management device via the network, wherein it is not necessary for the traffic flowing thorough the network switch to pass through the security management device to reach a destination as only copies of the potentially harmful traffic are passed to the security management device;

redirecting the potentially harmful traffic to the separately located security management device via the network responsive to a threat mitigation policy from the separately located security management device; and reducing network bandwidth consumed by the potentially harmful traffic associated with the service port responsive to receiving the threat mitigation policy from the separately located security management device by blocking the potentially harmful traffic associated with the service port according to the threat mitigation policy.

2. The method of claim 1, wherein the first and second protocols are transport layer protocols.

3. The method of claim 1, wherein the first protocol is Transmission Control Protocol (TCP) and the second protocol is User Datagram Protocol (UDP).

4. The method of claim 1, wherein mirroring the potentially harmful traffic associated with the service port to the separately located security management device on the network comprises doing so in accordance with a security policy.

5. The method of claim 1, further comprising reducing network bandwidth consumed by applications on known connection ports for the applications, the applications selected from the group consisting of Peer-to-Peer (P2P) applications, Internet Relay Chat (IRC) applications and gaming applications.

6. The method of claim 1, further comprising reducing network bandwidth consumed by applications on known connection ports for the applications, the applications selected from the group consisting of Peer-to-Peer (P2P) applications, Internet Relay Chat (IRC) applications and gaming applications.

7. The method of claim 1, wherein the separately located security management device operates virtually in-line with the network switch without requiring the traffic flowing through IP based network switch which is not identified as the potentially harmful traffic to travel through the separately located security management device.

8. The method of claim 1:

wherein mirroring the potentially harmful traffic associated with the service port to the separately located security management device via the network comprises the network switch mirroring the potentially harmful traffic to a port of the security management device dedicated to receiving mirrored threat traffic; and further wherein the traffic flowing through the network switch which does not violate the threat mitigation policy is handled by the network switch.

9. A system, comprising:

an Internet Protocol (IP) based network switch to identify, within traffic flowing through the network switch, potentially harmful traffic constituting a threat to efficient operation of the network via detection of at least two simultaneous connections on a service port of the network switch, wherein a first protocol is used for a first connection on the service port and a second protocol is used for a second connection on the service port, wherein the first protocol is different than the second protocol;

a security management device separately located from the network switch and communicatively interfaced with the network switch via the network, wherein the security management device is to receive a mirrored copy of the potentially harmful traffic from the network switch via the network, the potentially harmful traffic associated with the at least two simultaneous connections detected on the service port of the network switch, wherein it is not necessary for the traffic flowing thorough the network switch to pass through the security management device to reach a destination as only copies of the potentially harmful traffic are passed to the security management device, and wherein the security management device is further to send a threat mitigation policy to the network switch instructing the network switch to redirect the potentially harmful traffic to the separately located security management device via the network; and wherein the IP based network switch is further to reduce network bandwidth consumed by the potentially harmful traffic associated with the service port responsive to receiving the threat mitigation policy from the separately located security management device by blocking the potentially harmful traffic associated with the service port according to the threat mitigation policy.

10. The system of claim 9, wherein the first and second protocols are transport layer protocols.

11. The method of claim 9, wherein the first protocol is Transmission Control Protocol (TCP) and the second protocol is User Datagram Protocol (UDP).

12. The system of claim 9, where the separately located security management device operates virtually in-line with the network switch without requiring the traffic flowing through IP based network switch which is not identified as the potentially harmful traffic to travel through the separately located security management device.

13. The system of claim 9:

wherein the security management device separately to receive the mirrored copy of the potentially harmful traffic from the IP based network switch via the network comprises the security management device to receive the mirrored copy of the potentially harmful traffic at a port of the security management device dedicated to receive mirrored threat traffic; and further wherein the traffic flowing through the network switch which does not violate the threat mitigation policy is handled by the IP based network switch.

14. A network switch to operate within an Internet Protocol (IP) based network, the network switch comprising:

means for identifying, within traffic flowing through the network switch, potentially harmful traffic constituting a threat to efficient operation of the network by detecting at least two simultaneous connections on a service port of the network switch, wherein a first protocol is used for a first connection on the service port and a second protocol is used for a second connection on the service port, wherein the first protocol is different than the second protocol;

means for mirroring the potentially harmful traffic associated with the service port to a separately located security management device via the network, wherein it is not necessary for the traffic flowing thorough the network switch to pass through the security management device to reach a destination as only copies of the potentially harmful traffic are passed to the security management device;

means for redirecting the potentially harmful traffic to the separately located security management device via the network responsive to a threat mitigation policy from the separately located security management device; and means for reducing network bandwidth consumed by the potentially harmful traffic associated with the service port responsive to receiving the threat mitigation policy from the separately located security management device by blocking the potentially harmful traffic associated with the service port according to the threat mitigation policy.

15. The network switch of claim 14, wherein the means for mirroring the potentially harmful traffic associated with the service port to the separately located security management device comprises doing so in accordance with a security policy.

16. The network switch of claim 14, wherein the separately located security management device operates virtually in-line with the network switch without requiring the traffic flowing through IP based network switch which is not identified as the potentially harmful traffic to travel through the separately located security management device.

17. The network switch of claim 14:

wherein the means for mirroring the potentially harmful traffic associated with the service port to the separately located security management device via the network comprises means for mirroring the potentially harmful traffic to a port of the separately located security management device dedicated to receiving mirrored threat traffic; and further wherein the traffic flowing through the network switch which does not violate the threat mitigation policy is handled by the network switch.

\* \* \* \* \*